United States Patent
Lee

(10) Patent No.: US 11,691,537 B2
(45) Date of Patent: Jul. 4, 2023

(54) ELECTRIC FORKLIFT AND METHOD OF DRIVING THE SAME

(71) Applicant: DOOSAN CORPORATION, Seoul (KR)

(72) Inventor: Jin Yong Lee, Incheon (KR)

(73) Assignee: DOOSAN INDUSTRIAL VEHICLE CO., LTD., Incheon (KR)

( * ) Notice: Subject to any disclaimer, the term of this patent is extended or adjusted under 35 U.S.C. 154(b) by 100 days.

(21) Appl. No.: 16/234,853

(22) Filed: Dec. 28, 2018

(65) Prior Publication Data
US 2019/0202320 A1    Jul. 4, 2019

(30) Foreign Application Priority Data

Dec. 29, 2017    (KR) .................. 10-2017-0183522

(51) Int. Cl.
| | |
|---|---|
| *B60L 58/25* | (2019.01) |
| *B66F 9/075* | (2006.01) |
| *B60Q 5/00* | (2006.01) |
| *B66F 9/24* | (2006.01) |
| *B60L 50/60* | (2019.01) |

(Continued)

(52) U.S. Cl.
CPC .............. *B60L 58/25* (2019.02); *B60L 1/003* (2013.01); *B60L 50/60* (2019.02); *B60Q 5/005* (2013.01); *B66F 9/075* (2013.01); *B66F 9/07572* (2013.01); *B66F 9/24* (2013.01); *H01M 10/486* (2013.01); *B60L 2200/42* (2013.01);

(Continued)

(58) Field of Classification Search
CPC .............................. B60L 58/25; B60L 50/60
See application file for complete search history.

(56) References Cited

U.S. PATENT DOCUMENTS

| | | | |
|---|---|---|---|
| 8,594,869 B2 | 11/2013 | Hwang | |
| 10,026,309 B1 * | 7/2018 | Nepomuceno | ......... G08B 21/06 |

(Continued)

FOREIGN PATENT DOCUMENTS

| | | | | |
|---|---|---|---|---|
| CH | 680579 A5 | | 9/1992 | |
| DE | 102014106794 | * | 5/2014 | ................ B60L 3/00 |

(Continued)

OTHER PUBLICATIONS

Extended Search Report issued in corresponding European Patent Application No. 18001008.4 dated May 22, 2019, consisting of 13 pp.

*Primary Examiner* — Jess Whittington
(74) *Attorney, Agent, or Firm* — Volpe Koenig

(57) ABSTRACT

The present disclosure relates to an electric forklift and a method of driving the same which are capable of increasing a lifespan of a battery, and the electric forklift includes: a traveling motor which operates a wheel; a working machine motor which operates a working machine; a control unit which controls the operations of the traveling motor and the working machine motor based on an output control signal inputted from the outside; a battery which supplies electric power to the traveling motor, the working machine motor, and the control unit; and a temperature detecting unit which detects a temperature of the battery, in which the control unit controls an operation of at least one of the traveling motor and the working machine motor based on a detected temperature from the temperature detecting unit.

6 Claims, 4 Drawing Sheets

(51) Int. Cl.
  *H01M 10/48* (2006.01)
  *B60L 1/00* (2006.01)

(52) U.S. Cl.
  CPC ..... *B60L 2240/545* (2013.01); *B60L 2250/10* (2013.01); *H01M 2220/20* (2013.01)

(56) References Cited

U.S. PATENT DOCUMENTS

| | | | | |
|---|---|---|---|---|
| 2004/0140904 | A1* | 7/2004 | Bertness | H02J 7/0047 340/636.15 |
| 2011/0074432 | A1* | 3/2011 | Tinnemeyer | G01R 33/16 324/426 |
| 2016/0082860 | A1* | 3/2016 | Marchal | H01M 10/625 320/136 |
| 2016/0117906 | A1* | 4/2016 | Eifert | G01R 31/382 340/584 |
| 2016/0226291 | A1* | 8/2016 | Kratzer | G01R 31/374 |
| 2016/0368532 | A1* | 12/2016 | Weber | B62D 5/0484 |
| 2017/0368958 | A1* | 12/2017 | Eun | H01M 10/0525 |
| 2018/0154773 | A1* | 6/2018 | Dalum | B60K 25/06 |
| 2018/0201152 | A1* | 7/2018 | Newman | H02J 7/35 |
| 2018/0265145 | A1* | 9/2018 | Todd | B60K 31/00 |
| 2018/0297483 | A1* | 10/2018 | Pevear | B60L 50/60 |
| 2019/0001947 | A1* | 1/2019 | Lowe | G01S 13/862 |
| 2019/0047372 | A1* | 2/2019 | Schroeder | B60H 1/3225 |
| 2019/0115772 | A1* | 4/2019 | Takeda | H02P 6/28 |

FOREIGN PATENT DOCUMENTS

| | | |
|---|---|---|
| DE | 112013000094 T5 | 7/2015 |
| DE | 102014106794 A1 | 11/2015 |
| JP | 3156582 U | 1/2010 |
| JP | 2010-148338 A | 7/2010 |
| JP | 2017052462 A | 3/2017 |
| JP | 2017-076544 A | 4/2017 |
| KR | 10-2009-0071043 | 7/2009 |
| KR | 10-2014-0048674 | 4/2014 |

* cited by examiner

ELECTRIC FORKLIFT AND METHOD OF DRIVING THE SAME

CROSS-REFERENCE TO RELATED APPLICATIONS

This application claims benefit and priority to Korean Patent Application No. 10-2017-0183522, filed on Dec. 29, 2017 with the Korean Intellectual Property Office, the disclosure of which is incorporated herein in its entirety by reference.

TECHNICAL FIELD

The present disclosure relates to a forklift, and particularly, to an electric forklift and a method of driving the same which are capable of increasing a lifespan of a battery.

BACKGROUND

In general, a forklift is used to load or unload heavy items (goods) or carry heavy items to a desired position in a limited space. Based on power sources, the forklift is classified into an engine forklift and an electric forklift. In particular, the electric forklift is operated by electric power supplied from a battery. Therefore, work efficiency of the electric forklift is greatly affected by a lifespan of the battery.

SUMMARY

The present disclosure has been made in an effort to provide an electric forklift and a method of driving the same which are capable of increasing a lifespan of a battery.

An exemplary embodiment of the present invention provides an electric forklift including: a traveling motor which operates a wheel; a working machine motor which operates a working machine; a control unit which controls the operations of the traveling motor and the working machine motor based on an output control signal inputted from the outside; a battery which supplies electric power to the traveling motor, the working machine motor, and the control unit; and a temperature detecting unit which detects a temperature of the battery, in which the control unit controls an operation of at least one of the traveling motor and the working machine motor based on a detected temperature from the temperature detecting unit.

When the detected temperature is higher than a predetermined reference temperature, the control unit may operate at least one of the traveling motor and the working machine motor with a corrected output smaller than a normal output set based on the output control signal.

When the detected temperature is higher than the reference temperature, the corrected output may have a smaller value as a temperature difference between the detected temperature and the reference temperature is increased.

The electric forklift may further include a lookup table in which predetermined multiple corrected outputs are stored based on the temperature difference and the normal output.

The control unit may select any one corrected output corresponding to the temperature difference and the normal output from the lookup table and operate at least one of the traveling motor and the working machine motor with the selected corrected output.

The electric forklift may further include an alarm unit which outputs alarm sound when at least one of the traveling motor and the working machine motor operates with the corrected output.

The corrected output may be set by multiplying the normal output by a correction factor predetermined based on the temperature difference.

The correction factor may have a smaller value as the temperature difference is increased.

When the detected temperature is equal to or lower than the predetermined reference temperature, the control unit may operate at least one of the traveling motor and the working machine motor with the normal output.

The temperature detecting unit may detect a temperature of an electrolyte of the battery.

Another exemplary embodiment of the present disclosure provides a method of driving an electric forklift including: a wheel; a traveling motor which operates the wheel; a working machine; a working machine motor which operates the working machine; and a battery which supplies electric power to the traveling motor and the working machine motor, the method including: detecting a temperature of the battery; and controlling an operation of at least one of the traveling motor and the working machine motor based on the detected temperature.

The controlling of the operation of at least one of the traveling motor and the working machine motor based on the detected temperature may include operating at least one of the traveling motor and the working machine motor with a corrected output smaller than a normal output inputted to the electric forklift when the detected temperature is higher than a predetermined reference temperature.

When the detected temperature is higher than the reference temperature, the corrected output may have a smaller value as a temperature difference between the detected temperature and the reference temperature is increased.

The method of driving the electric forklift may further include outputting alarm sound when at least one of the traveling motor and the working machine motor operates with the corrected output.

The corrected output may be set by multiplying the normal output by a correction factor (an integer smaller than 1) predetermined based on the temperature difference.

The correction factor may have a smaller value as the temperature difference is increased.

The controlling of the operation of at least one of the traveling motor and the working machine motor based on the detected temperature may include operating at least one of the traveling motor and the working machine motor with the normal output when the detected temperature is equal to or lower than the predetermined reference temperature.

The detecting of the temperature may include detecting a temperature of an electrolyte of the battery.

The electric forklift and the method of driving the same according to the present disclosure provide the following effect.

According to the present disclosure, an increase in temperature of the battery of the electric forklift is inhibited, and as a result, the lifespan of the battery may be increased.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
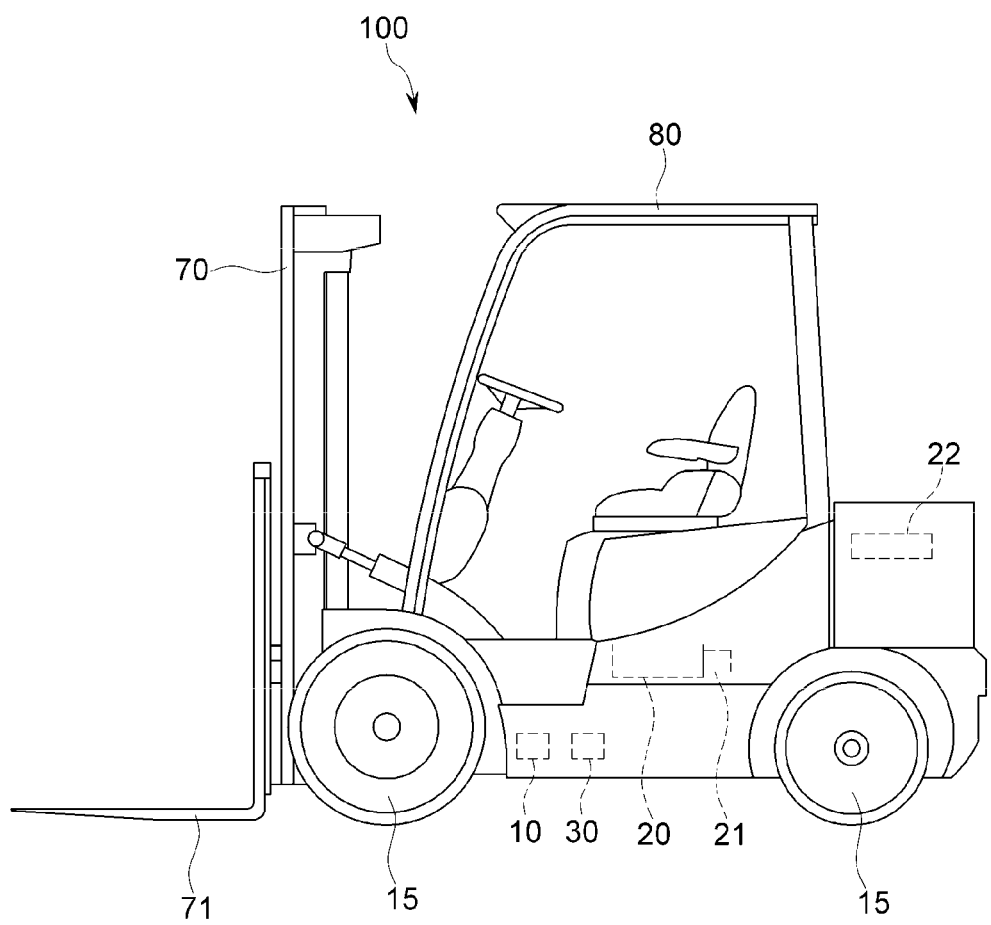
FIG. 1 is a side view of an electric forklift according to an exemplary embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Advantages and features of the present disclosure and methods of achieving the advantages and features will be clear with reference to exemplary embodiments described in detail below together with the accompanying drawings. However, the present disclosure is not limited to exemplary embodiments disclosed herein, but will be implemented in various forms, the exemplary embodiments are provided so as to completely disclose the present disclosure and to completely inform a person with ordinary skill in the art to which the present disclosure pertains of the scope of the present disclosure, and the present disclosure will be defined only by the scope of the appended claims. Therefore, in some exemplary embodiments, well-known process steps, well-known element structure, and well-known technologies will not be specifically described in order to avoid obscuring the present disclosure. Like reference numerals indicate like constituent elements throughout the specification.

In the present specification, when one constituent element is referred to as being "directly connected to" another constituent element, one constituent element can be directly connected to the other constituent element, and one constituent element can also be "physically or electrically connected to" the other element with other elements interposed therebetween. In addition, unless otherwise described, the word "comprise" and variations such as "comprises" or "comprising" will be understood to imply the inclusion of stated elements, not the exclusion of any other elements.

In the present specification, the terms such as "first", "second", and "third" may be used to describe various constituent elements, but the constituent elements should not be limited by the terms. The terms are used for the purpose of distinguishing one constituent element from the other constituent elements. For example, a first constituent element may be named a second or third constituent element, and similarly, the second or third constituent element may also be named the first constituent element, without departing from the scope of the present disclosure.

Unless otherwise defined, all terms (including technical and scientific terms) used in the present specification may be used as the meaning which may be commonly understood by the person with ordinary skill in the art to which the present disclosure belongs. In addition, terms defined in a generally used dictionary shall not be construed ideally or excessively unless clearly and specially defined in the present specification.

Hereinafter, an electric forklift and a method of driving the same according to the present disclosure will be described in detail with reference to FIGS. 1 to 4.

Figure 2:
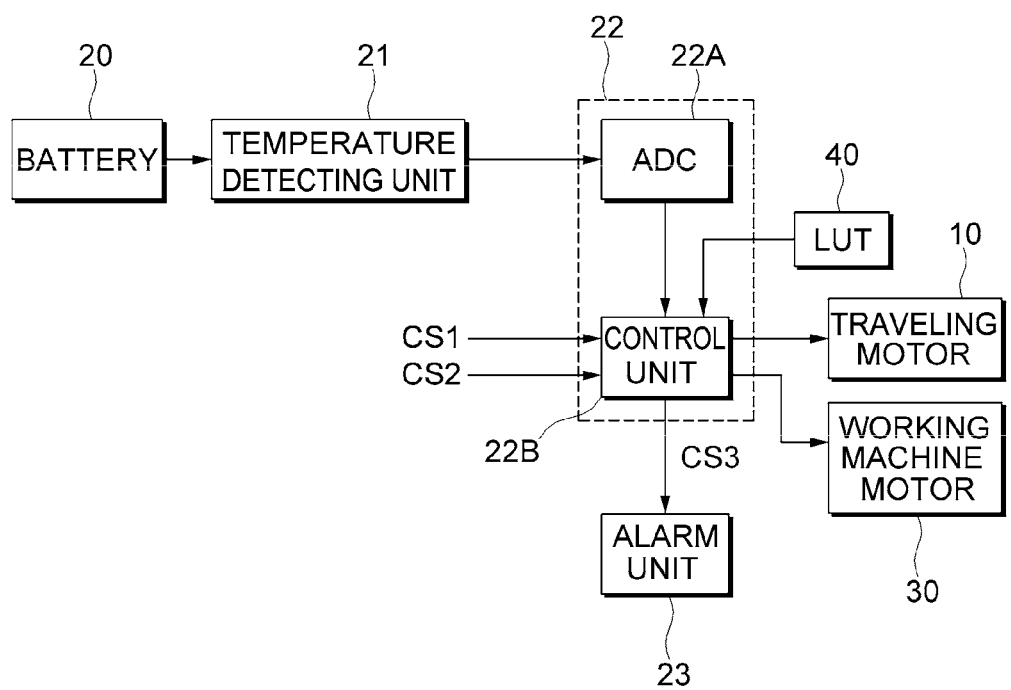
FIG. 2 is a view for explaining operations of a control device, a temperature detecting unit, and an alarm unit in FIG. 1.

FIG. 1 is a side view of an electric forklift 100 according to an exemplary embodiment of the present disclosure, and FIG. 2 is a view for explaining operations of a control device 22, a temperature detecting unit 21, and an alarm unit 23 in FIG. 1.

As illustrated in FIGS. 1 and 2, the electric forklift 100 according to the exemplary embodiment of the present disclosure may include a mast assembly 70, an overhead 80, wheels 15, a traveling motor 10, a working machine 71, a working machine motor 30, the control device 22, the temperature detecting unit 21, and a battery 20.

The electric forklift 100 according to the present disclosure may further include at least one of the alarm unit 23 (or a warning buzzer) and a lookup table 40.

In addition, although not illustrated, the electric forklift 100 of the present disclosure may further include a device for transmitting power through a hydraulic motor. This device may transmit power by using a fluid in a hydraulic pressure tank. For example, this device may include a lift cylinder, a tilt cylinder, a steering cylinder, a lift control valve, a tilt control valve, an option control valve, a steering unit, and the like.

Meanwhile, positions of the traveling motor 10, the working machine motor 30, the control device 22, the temperature detecting unit 21, and the battery 20 in FIG. 1 may vary depending on the type of electric forklift 100.

The wheels 15 are positioned at front and rear sides of the electric forklift 100, respectively. The wheel 15 has a circular shape. A steering angle of the wheel 15 may be controlled by the steering unit.

The working machine 71 is connected to the mast assembly 70. The working machine 71 may be, for example, a fork.

The overhead 80 is positioned at a rear side of the mast assembly 70.

The traveling motor 10 controls the travel of the electric forklift 100. The wheels 15 are connected to the traveling motor 10. The wheels 15 may be rotated clockwise or counterclockwise by power transmitted from the traveling motor 10.

The working machine motor 30 controls motion of the working machine 71, for example, the fork of the electric forklift 100. The working machine 71 is connected to the working machine motor 30. The working machine 71 may be moved upward or downward by the working machine motor 30.

The temperature detecting unit 21 detects a temperature of the battery 20, for example, a temperature of an electrolyte of the battery 20. The temperature detecting unit 21 may be positioned in an outer casing of the battery 20 or in the battery 20. The temperature detecting unit 21 may be, for example, a temperature sensor.

A temperature detected by the temperature detecting unit 21 (hereinafter, referred to as a 'detected temperature') is supplied to an analog-digital converter 22A of the control device 22.

As illustrated in FIG. 2, the control device 22 may include a control unit 22B and the analog-digital converter 22A.

The analog-digital converter 22A is supplied with an analog signal corresponding to the detected temperature from the temperature detecting unit 21, converts the analog signal into a digital signal, and outputs the digital signal. That is, the analog-digital converter 22A outputs the digital signal corresponding to the detected temperature. The analog-digital converter 22A may be embedded in any one of the control unit 22A and the temperature detecting unit 21.

Based on an output control signal (e.g., a traveling output control signal CS1 and a working machine output control signal CS2) inputted from the outside and the digital signal (hereinafter, referred to as the 'detected temperature') from the analog-digital converter 22A, the control unit 22B may control operations of the traveling motor 10 and the working machine motor 30.

For example, the control unit 22B may control an output of the traveling motor 10 and an output of the working machine motor 30. As a more specific example, the control unit 22B may control a rotational speed (revolutions per minute (RPM)) of the traveling motor 10 and a rotational speed of the working machine motor 30.

The traveling output control signal CS1 may be inputted by an operator of the electric forklift 100 (hereinafter, referred to as an 'operator'). For example, when the operator applies pressure to an accelerator pedal of the electric forklift 100, the traveling output control signal CS1 corresponding to the pressure is generated, and the generated traveling output control signal CS1 is supplied to the control unit 22B. Then, the control unit 22B supplies the traveling motor 10 with an output having a magnitude corresponding to the traveling output control signal CS1. Therefore, the traveling motor 10 rotates at the rotational speed corresponding to the magnitude of the output.

The higher the pressure applied to the accelerator pedal, the larger the magnitude of the traveling output control signal CS1. Therefore, the higher the pressure, the larger the output supplied to the traveling motor 10. In other words, the higher the pressure, the higher the rotational speed of the traveling motor 10.

The working machine output control signal CS2 may be inputted by the operator. For example, when the operator applies pressure to a working machine lever of the electric forklift 100, the working machine output control signal CS2 corresponding to the pressure is generated, and the generated working machine output control signal CS2 is supplied to the control unit 22B. Then, the control unit 22B supplies the working machine motor 30 with an output having a magnitude corresponding to the working machine output control signal CS2. Therefore, the working machine motor 30 rotates at the rotational speed corresponding to the magnitude of the output.

The higher the pressure applied to the working machine lever, the larger the magnitude of the working machine output control signal CS2. Therefore, the higher the pressure, the larger the output supplied to the working machine motor 30. In other words, the higher the pressure, the higher the rotational speed of the working machine motor 30.

Meanwhile, as a higher output is applied to the traveling motor 10, the consumption of power of the battery 20 by the traveling motor 10 is increased, and thus a temperature of the battery 20 may be increased. Here, the temperature of the battery 20 may be, for example, a temperature of an electrolyte of the battery 20.

Likewise, as a higher output is applied to the working machine motor 30, the consumption of power of the battery 20 by the working machine motor 30 is increased, and thus the temperature of the battery 20 may be increased. Here, the temperature of the battery 20 may be, for example, the temperature of the electrolyte of the battery 20.

As the temperature of the battery 20 is increased to a predetermined degree or more, a lifespan of the battery 20 may be reduced. To prevent the reduction in lifespan of the battery 20, the control unit 22B controls at least one of the operations of the traveling motor 10 and the working machine motor 30 based on the temperature of the battery 20, for example, the temperature of the electrolyte of the battery 20.

For example, when the temperature of the battery 20 is equal to or higher than a predetermined degree, the control unit 22B may restrict performances of the traveling motor 10 and the working machine motor 30. This configuration will be specifically described below.

The control unit 22B is supplied with information about the temperature of the battery 20 from the temperature detecting unit 21 through the analog-digital converter 22A. In other words, the control unit 22B is supplied with the detected temperature from the temperature detecting unit 21. In this case, as described above, the detected temperature, as the digital signal, is supplied to the control unit 22B.

The control unit 22B may be periodically supplied with the detected temperature from the temperature detecting unit 21.

The control unit 22B compares the detected temperature with a predetermined reference temperature, and based on a comparison result, the control unit 22B operates at least one of the traveling motor 10 and the working machine motor 30 with an output (hereinafter, referred to as a 'corrected output') having a smaller magnitude than a normal output.

The normal output means a magnitude of the output control signal inputted by the operator or means an output set by the output control signal. For example, the normal output means a magnitude of the traveling output control signal CS1 inputted by the operator or means a traveling output set by the traveling output control signal CS1. In addition, the normal output means a magnitude of the working machine output control signal CS2 inputted by the operator or means a working machine output set by the working machine output control signal CS2.

In other words, the normal output related to the travel means an output corresponding to a magnitude of the pressure applied to the accelerator pedal by the operator. In addition, the normal output related to the working machine means an output corresponding to the magnitude of the pressure applied to the working machine lever by the operator.

When the detected temperature is equal to or lower than the reference temperature, the control unit 22B operates the traveling motor 10 and the working machine motor 30 with the normal output. In other words, when the temperature of the battery 20 is low, the traveling motor 10 and the working machine motor 30 operate with the output (i.e., the normal output) inputted (or requested) by the operator.

In contrast, when the detected temperature is higher than the reference temperature, the control unit 22B operates the motor (i.e., at least one of the traveling motor 10 and the working machine motor 30) with the corrected output, which has a smaller magnitude than the normal output, instead of the normal output. Meanwhile, unless separately described, the term "motor" hereinafter means at least one of the traveling motor 10 and the working machine motor 30.

Therefore, even though the operator applies high pressure to the accelerator pedal or the working machine lever, an actual output, which is applied to the motor when the temperature of the battery 20 is high, has a smaller magnitude than the normal output. Therefore, an increase in temperature of the battery 20 may be prevented.

When the detected temperature is higher than the reference temperature, the corrected output has a smaller magnitude (or value) as a difference between the detected temperature and the reference temperature (i.e., Detected Temperature−Reference Temperature, hereinafter, referred to as a 'temperature difference') is increased. In other words, the magnitude of the corrected output is inversely proportional to the magnitude of the temperature difference. Therefore, as the temperature of the battery 20 is increased, the output of the motor is linearly decreased in proportion to the temperature of the battery 20. Meanwhile, unless separately described, the term "temperature difference" hereinafter means a value made by subtracting the reference temperature from the detected temperature in a situation in which the detected temperature is higher than the reference temperature.

The corrected output may be calculated by multiplying the normal output by a correction factor predetermined based on the temperature difference. Here, the correction factor is a positive integer smaller than 1. The greater the temperature difference, the smaller the value of the correction factor.

Meanwhile, when the motor operates with the corrected output, the control unit 22B may supply an alarm control signal CS3 to the alarm unit 23.

The alarm unit 23 outputs alarm sound in response to the alarm control signal CS3 from the control unit 22B. In other words, when the motor operates with the corrected output, the alarm unit 23 generates the alarm sound in order to notify the operator of this situation. Therefore, by the alarm sound from the alarm unit 23, the operator may recognize that the output of the motor is forcibly reduced due to the high temperature of the battery 20.

Meanwhile, the alarm unit 23 may generate periodically flickering light instead of the alarm sound. In addition, the alarm unit 23 may generate both of the alarm sound and the light.

The alarm unit 23 may be attached in the vicinity of a driver seat of the electric forklift 100. For example, the alarm unit 23 may be attached to the steering unit, that is, the steering wheel 15.

Multiple corrected outputs having different values may be stored in advance in the lookup table 40. The respective corrected outputs may have different values based on the temperature difference and the normal output.

From the lookup table 40, the control unit 22B may select any one corrected output corresponding to the temperature difference and the normal output and operate the motor with the selected corrected output.

A configuration of the lookup table 40 will be described below in detail with reference to FIG. 3.

Figure 3:
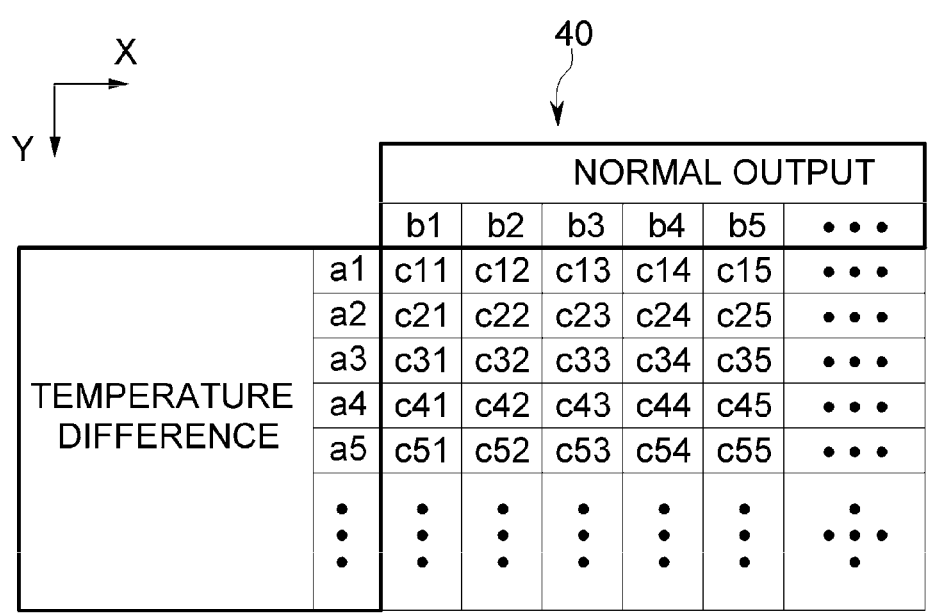
FIG. 3 is a view illustrating a lookup table in FIG. 2.

FIG. 3 is a view illustrating the lookup table 40 in FIG. 2.

In FIG. 3, a1, a2, a3, a4, and a5 mean values of the temperature difference, and the value of the temperature difference is gradually increased in a Y-axis direction.

In FIG. 3, b1, b2, b3, b4, and b5 mean values of the normal output, and the value of the normal output is gradually increased in the X-axis direction.

In FIG. 3, c11, c12, c13, c14, c15, c21, c22, c23, c24, c25, c31, c32, c33, c34, c35, c41, c42, c43, c44, c45, . . . , and c51, c52, c53, c54, c55, . . . mean values of the corrected output. Here, the value of the corrected output is gradually decreased in an X-axis direction.

The value of the corrected output is positioned at a position where a column including particular values of the temperature difference and a row including particular values of the normal output intersect each other.

For example, assuming that the value of the temperature difference is a1 and the value of the normal output is b2, the value of the corrected output is c11. In other words, the control unit 22B selects c11 as the corrected output and operates the motor with the selected corrected output of c11 in a case in which the detected temperature from the temperature detecting unit 21 is higher than the reference temperature, the temperature difference between the detected temperature and the reference temperature is a1, and the value of the normal output inputted by the operator at that time is b1.

As another example, the control unit 22B selects c21 as the corrected output and operates the motor with the selected corrected output of c21 in a case in which the detected temperature from the temperature detecting unit 21 is higher than the reference temperature, the temperature difference between the detected temperature and the reference temperature is a2, and the value of the normal output inputted by the operator at that time is b1. Here, c21 has a smaller value than c11. For example, c11 may be 0.7 times b1, and c21 may be 0.5 times b1. In this case, the motor, which receives the corrected output of c11, operates with the output which is 70% of the normal output, and the motor, which receives the corrected output of c21, operates with the output which is 50% of the normal output.

Meanwhile, the control unit 22B operates the motor with the normal output of b1 in a case in which the detected temperature from the temperature detecting unit 21 is lower than the reference temperature and the value of the normal output inputted by the operator at that time is b1.

As the value of the normal output is increased, the correction factor to be multiplied by the value of the normal output may be decreased. For example, c11 may be calculated by multiplying b1 by the correction factor of 0.7, and c12 may be calculated by multiplying b2 by the correction factor of 0.5.

The lookup table 40 in FIG. 3 may be embedded in the control device 22.

Figure 4:
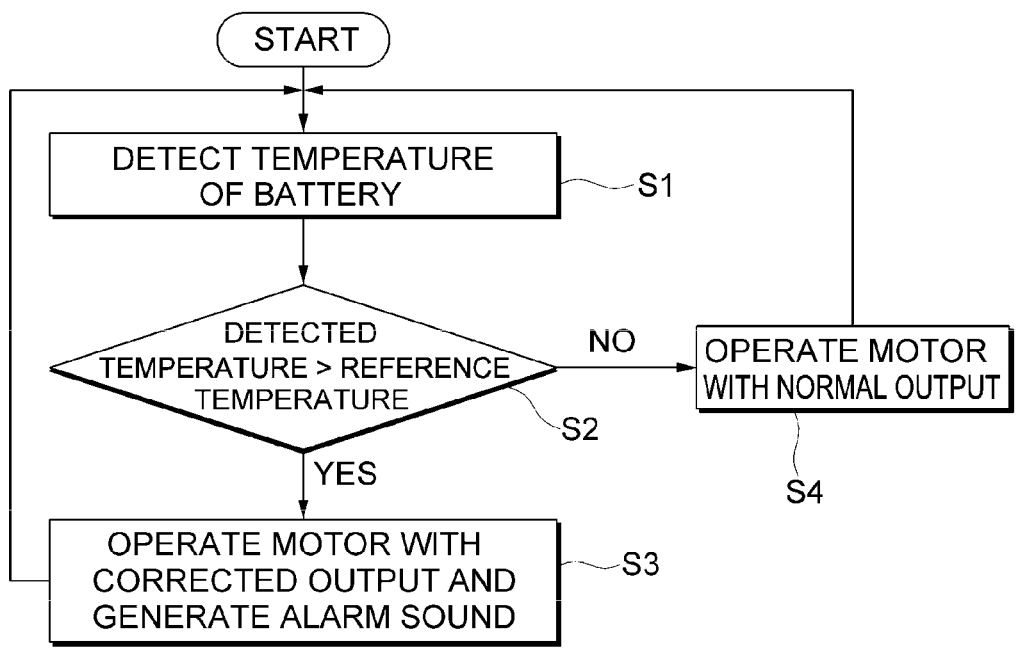
FIG. 4 is a flowchart for explaining a method of driving the electric forklift according to the present disclosure.

FIG. 4 is a flowchart for explaining a method of driving the electric forklift 100 according to the present disclosure.

First, the temperature of the battery 20 of the electric forklift 100 is detected (S1).

Thereafter, the temperature of the battery 20, that is, the detected temperature is compared with the reference temperature (S2). In a case in which it is ascertained from the comparison result that the detected temperature is higher than the reference temperature, the motor operates with the corrected output and the alarm sound is generated (S3). In this case, the value of the corrected output is determined based on the temperature difference between the detected temperature and the reference temperature. For example, the higher the temperature difference, the smaller the value of the corrected output.

In contrast, in a case in which it is ascertained from the comparison result that the detected temperature is equal to or lower than the reference temperature, the motor operates with the normal output (S4).

Meanwhile, when the temperature of the battery 20 is decreased again and thus the detected temperature becomes equal to or lower than the reference temperature after the motor operates with the corrected output, the motor operates with the normal output again.

When the temperature of the battery 20 is increased again and thus the detected temperature becomes higher than the reference temperature after the motor operates with the normal output, the motor operates with the corrected output again.

The present disclosure, which has been described above, is not limited by the aforementioned exemplary embodiment and the accompanying drawings, and it will be obvious to those skilled in the art to which the present disclosure pertains that various substitutions, modifications and alterations may be made without departing from the technical spirit of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An electric forklift comprising:
a traveling motor which operates a wheel;
a working machine motor which operates a working machine;
a controller which controls the traveling motor and the working machine motor to operate at a normal output that reflects a current state of operation motor control devices based on an output control signal;
a battery which supplies electric power to the traveling motor, the working machine motor, and the controller;
a temperature detector which detects a temperature of the battery; and
an alarm unit,
wherein when a detected temperature from the temperature detector is greater than a predetermined reference temperature, the controller operates at least one of the traveling motor and the working machine motor with a corrected output smaller than the normal output,
wherein the controller supplies an alarm control signal to the alarm unit when at least one of the traveling motor and the working machine motor operates with the corrected output,
wherein the alarm unit outputs both alarm sound and light in response to the alarm control signal from the controller when at least one of the traveling motor and the working machine motor operates with the corrected output,
wherein the temperature detector is disposed inside the battery,
wherein the temperature detector detects a temperature of an electrolyte of the battery,
wherein when detected temperature from the temperature detector becomes equal to or lower than the reference temperature after the at least one of the traveling motor and the working machine motor operates with the corrected output, the at least one of the traveling motor and the working machine motor operates with the normal output again,
wherein the alarm unit outputs both the alarm sound and the light in response to the alarm control signal supplied from the controller when the at least one of the traveling motor and the working machine motor operates with the corrected output in order to notify an operator that an output of the at least one of the traveling motor and the working machine motor is forcibly reduced due to the high temperature of the battery,
wherein the corrected output is set by multiplying the normal output by a predetermined correction factor based on a temperature difference between the detected temperature and the reference temperature and a value of the normal output selected from among a group of predetermined correction factors defined such that:
values of the predetermined correction factors decrease as temperature differences increase, and
values of the predetermined correction factors decrease as values of normal outputs increase.

2. The electric forklift of claim 1, further comprising:
a lookup table in which the predetermined correction factors are stored,
wherein the controller selects a value corresponding to the temperature difference and the normal output from the lookup table to set the corrected output.

3. The electric forklift of claim 1 wherein the working machine is a lift fork.

4. An electric forklift comprising:
a traveling motor which operates a wheel;
a working machine motor which operates a working machine;
a controller which controls the traveling motor and the working machine motor to operate at a normal output that reflects a current state of operation motor control devices based on an output control signal;
a battery which supplies electric power to the traveling motor, the working machine motor, and the controller; and
a temperature detector which detects a temperature of the battery;
wherein when a detected temperature from the temperature detector is greater than a predetermined reference temperature, the controller operates at least one of the traveling motor and the working machine motor with a corrected output smaller than the normal output,
wherein the corrected output is set by multiplying the normal output by a predetermined correction factor that is based on a temperature difference between the detected temperature and the reference temperature and a value of the normal output selected from among a group of predetermined correction factors defined such that:
values of the predetermined correction factors decrease as temperature differences increase, and
values of the predetermined correction factors decrease as values of normal outputs increase.

5. The electric forklift of claim 4, further comprising:
a lookup table in which the predetermined correction factors are stored,
wherein the controller selects a value corresponding to the temperature difference and the normal output from the lookup table to set the corrected output.

6. The electric forklift of claim 4 wherein the working machine is a lift fork.

* * * * *